(12) United States Patent
Wu et al.

(10) Patent No.: US 7,995,341 B2
(45) Date of Patent: Aug. 9, 2011

(54) ELECTRONIC DEVICE WITH HEAT DISSIPATING MECHANISM

(75) Inventors: Hung-Yi Wu, Taipei Hsien (TW); Xiao-Zhu Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/727,242

(22) Filed: Mar. 19, 2010

(65) Prior Publication Data

US 2011/0157822 A1 Jun. 30, 2011

(30) Foreign Application Priority Data

Dec. 25, 2009 (CN) .......................... 2009 1 0312274

(51) Int. Cl.
*H05K 7/20* (2006.01)

(52) U.S. Cl. ....... 361/695; 361/690; 165/80.1; 174/16.1

(58) Field of Classification Search ........................ None
See application file for complete search history.

(56) References Cited

U.S. PATENT DOCUMENTS

| | | | | |
|---|---|---|---|---|
| 5,543,662 | A * | 8/1996 | Burward-Hoy | 257/716 |
| 5,773,755 | A * | 6/1998 | Iwatare | 174/17 VA |
| 5,894,407 | A * | 4/1999 | Aakalu et al. | 361/695 |
| 6,016,250 | A * | 1/2000 | Hanners | 361/695 |
| 6,128,188 | A * | 10/2000 | Hanners | 361/694 |
| 6,278,607 | B1 * | 8/2001 | Moore et al. | 361/679.54 |
| 6,330,157 | B1 * | 12/2001 | Bezama et al. | 361/704 |
| 7,206,202 | B2 * | 4/2007 | Yang | 361/690 |
| 7,778,029 | B2 * | 8/2010 | Ueno | 361/695 |

* cited by examiner

*Primary Examiner* — Boris L Chervinsky
(74) *Attorney, Agent, or Firm* — Zhigang Ma

(57) ABSTRACT

An electronic device includes a base and a sidewall attached to the base. The sidewall includes a heat dissipating area defining a plurality of vents, a sliding plate slidably coupled to an inner side of the sidewall, and a controlling arm made of metal material having high coefficient of thermal expansion. The controlling arm is connected between the sliding plate and the sidewall, for driving the sliding plate to slide to cover or uncover the vents of the heat dissipating area according to different interior temperature of the electronic device.

6 Claims, 3 Drawing Sheets

ELECTRONIC DEVICE WITH HEAT DISSIPATING MECHANISM

BACKGROUND

1. Technical Field

The present disclosure relates generally to electronic devices and, particularly, to an electronic device with a heat dissipating mechanism.

2. Description of Related Art

An electronic device, such as a computer or a power supply, generally includes a sidewall defining a plurality of vents, and at least one fan installed in the electronic device to discharge heat out of the electronic device through the vents. However, if there are too many vents, a lot of dust may enter the electronic device; if there are too few vents, heat in the electronic device will not be vented adequately and quickly.

DETAILED DESCRIPTION

Figure 1:
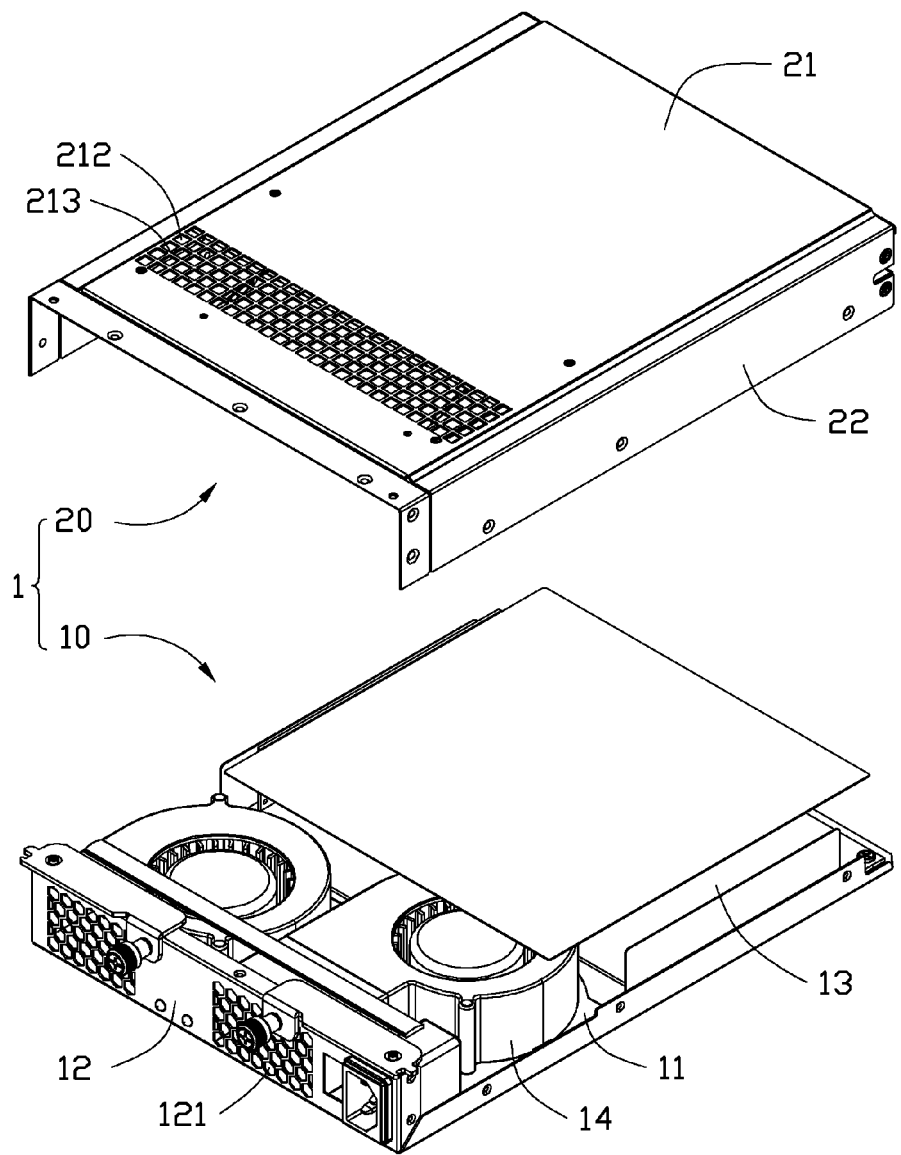
FIG. 1 is an exploded, isometric view of an embodiment of an electronic device with a heat dissipating mechanism, the electronic device including a sidewall.

Referring to FIG. 1, an embodiment of an electronic device 1 includes a base 10 and a sidewall 20 covering the base 10. In this embodiment, the electronic device 1 is a power supply.

The base 10 includes a bottom plate 11, a first end plate 12 perpendicularly extending up from a front end of the bottom plate 11, a plurality of electronic components 13 installed on the bottom plate 11, and two fans 14 installed on the bottom plate 11 between the first end plate 12 and the electronic components 13. A plurality of vents 121 is defined in the first end plate 12 in alignment with the fans 14.

Figure 2:
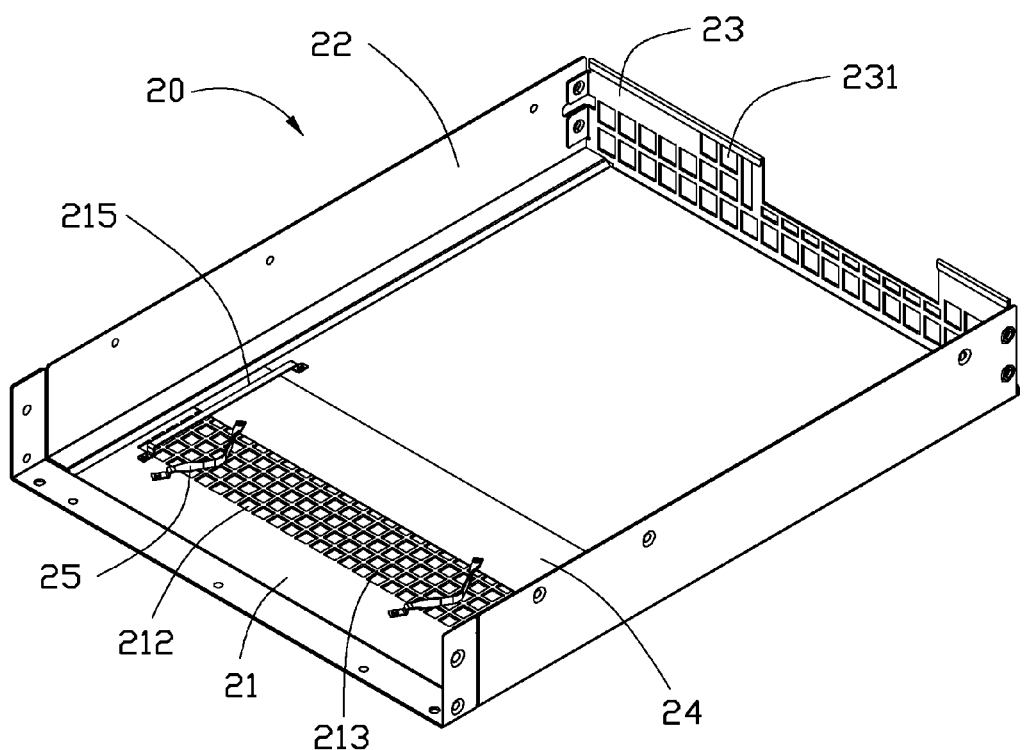
FIG. 2 is an inverted view of the sidewall of FIG. 1.

Referring to FIG. 2, the sidewall 20 includes a top plate 21, two side plates 22 perpendicularly extending down from opposite sides of the top plate 21, a second end plate 23 perpendicularly extending down from a rear end of the top plate 21, and a heat dissipating mechanism. The heat dissipating mechanism includes a sliding plate 24, and two controlling arms 25. A plurality of vents 231 is defined in the second end plate 23.

The top plate 21 defines a plurality of vents 212 away from the second end plate 23. The plurality of vents 212 is rectangularly arrayed and forms a heat dissipating area 213. Two supporting arms 215 are installed on an inner side of the top plate 21 parallel to the side plates 22 and extending across the heat dissipating area 213. The supporting arms 215 are adjacent to the side plates 22 respectively. Each supporting arm 215 includes a middle section parallel to the top plate 21 and slightly separated from the top plate 21, and two opposite ends are bent towards the top plate 21 and correspondingly fixed to front and rear sides of the heat dissipating area 213. The length of each supporting arm 215 is greater than the width of the heat dissipating area 213 along a direction parallel to the side plates 22. A first end of each supporting arm 215 is fixed adjacent to the front side of the heat dissipating area 213, and a second end of each supporting arm 215 extends across the heat dissipating area and is fixed away from the heat dissipating area 213. In this embodiment, the length of each supporting arm 215 is substantially twice the width of the heat dissipating area 213 along a direction parallel to the side plates 22.

The sliding plate 24 is rectangular-shaped corresponding to the heat dissipating area 213. The sliding plate 24 is slidably supported by the supporting arms 215, and slidably sandwiched between the top plate 21 and the supporting arms 215.

Each controlling arm 25 is an elongated metal piece having high coefficient of thermal expansion. A first end of each controlling arm 25 is fixed to the inner side of the top plate 21 adjacent to the front side of the heat dissipating area 213, and a second end of each controlling arm 25 is fixed to the sliding plate 24. At a normal operating temperature such as room temperature, the controlling arms 25 are distorted, the sliding plate 24 is drawn by the controlling arms 25 to cover all the vents 212 or some of the vents 212 away from the front side of the heat dissipating area 213.

To assemble the electronic device 1, the sidewall 20 is attached to the base 10 via a plurality of fasteners, such as screws, with the second end plate 23 of the sidewall 20 being opposite to the first end plate 12 of the base 10.

Figure 3:
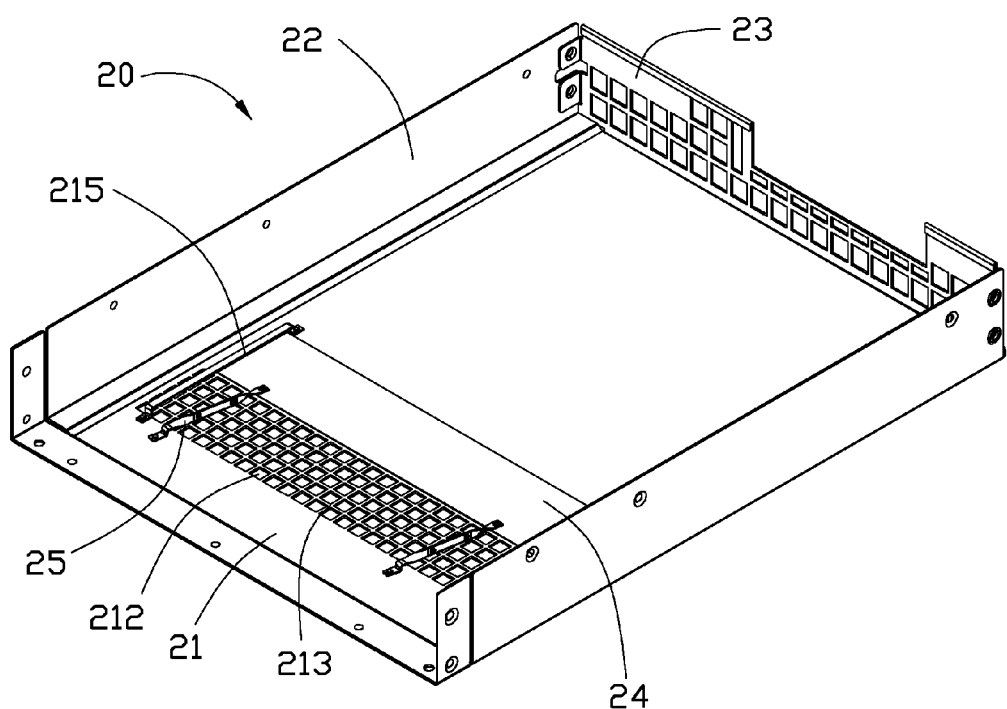
FIG. 3 is similar to FIG. 2, but showing the sidewall in a different state.

Referring to the FIG. 3, in use, the electronic components 13 in the electronic device 1 operates and produces heat. The interior temperature of the electronic device 1 increases. The fans 14 cooperate with the vents 121 and 231 of the first and second end plates 12 and 23 to discharge heat out of the electronic device 1. The controlling arms 25 are heated, and expand to push the sliding plate 24 to slide away from the heat dissipating area 213. Thereby, more vents 212 of the heat dissipating area 213 are exposed, which allows more heat in the electronic device 1 to be discharged. When the interior temperature of the electronic device 1 increases to a predetermined value, the controlling arms 25 expand and push the sliding plate 274 to slide to completely uncover the heat dissipating area. Thereby, all the vents 212 of the heat dissipating area 213 are exposed.

When the electronic device 1 is in not in use, the interior temperature of the electronic device 1 decreases to room temperature, the controlling arms 25 shrink and pull the sliding plate 274 to slide to cover all the vents 212 or some of the vents 212 away from the front side of the heat dissipating area 213, which can prevent or diminish the penetration of dust.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An electronic device, comprising:
   a base; and
   a sidewall attached to the base, the sidewall comprising a heat dissipating area defining a plurality of vents, a sliding plate slidably coupled to an inner side of the sidewall, and a controlling arm made of metal material having high coefficient of thermal expansion, wherein the controlling arm is connected between the sliding plate and the sidewall, the controlling arm is distorted at a normal operating temperature and draws the sliding plate to cover all or some of the vents of the heat dissipating area, when the interior temperature of the electronic device increases, the controlling arm expands to drive the sliding plate away from the heat dissipating area to uncover all or some of the vents of the heat dissipating area.

2. The electronic device of claim 1, further comprising a plurality of electronic components installed on the base.

3. The electronic device of claim 1, wherein two supporting arms are installed on the inner side of the sidewall and extend across the heat dissipating area, the sliding plate is supported by the supporting arms.

4. The electronic device of claim 1, wherein one end of the controlling arm is fixed to the inner side of the sidewall adjacent to a side of the heat dissipating area, and an opposite end of the controlling arm is fixed to the sliding plate.

5. The electronic device of claim 1, wherein the base comprises a bottom plate, and a first end plate perpendicularly extending up from a front end of the bottom plate, the sidewall comprising a top plate, two side plates perpendicularly extending down from opposite sides of the top plate, and a second end plate opposite to the first end plate perpendicularly extending down from a rear end of the top plate, each of the first and second end plates defines a plurality of vents, the heat dissipating area is defined in the top plate, the sliding plate and the controlling arm are installed on an inner side of the top plate.

6. The electronic device of claim 5, wherein a fan is installed on the base aligning with the vents of the first end plate.

\* \* \* \* \*